United States Patent
Appleby et al.

(10) Patent No.: US 8,232,901 B2
(45) Date of Patent: Jul. 31, 2012

(54) DETERMINING AN ALTERNATIVE CHARACTER STRING

(75) Inventors: Richard M. Appleby, Warsash (GB); Bharat V. Bedi, Portsmouth (GB); Marc S. Carter, London (GB); Lucas W. Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/145,733

(22) Filed: Jun. 25, 2008

(65) Prior Publication Data

US 2009/0007080 A1 Jan. 1, 2009

(30) Foreign Application Priority Data

Jun. 29, 2007 (EP) ..................................... 07111433

(51) Int. Cl.
*H03M 7/00* (2006.01)
(52) U.S. Cl. ................ 341/50; 341/15; 341/80; 341/84; 341/62
(58) Field of Classification Search ............ 341/50, 341/51, 62, 84, 80; 345/169, 163; 717/136; 715/816
See application file for complete search history.

(56) References Cited

U.S. PATENT DOCUMENTS

| | | | |
|---|---|---|---|
| 5,231,698 A * | 7/1993 | Forcier | 715/273 |
| 5,574,447 A | 11/1996 | Roylance | |
| 5,613,090 A * | 3/1997 | Willems | 719/329 |
| 6,047,300 A | 4/2000 | Walfish et al. | |
| 6,493,736 B1 * | 12/2002 | Forcier | 715/273 |
| 7,088,341 B2 | 8/2006 | Koch et al. | |
| 7,376,752 B1 * | 5/2008 | Chudnovsky et al. | 709/245 |
| 2002/0163504 A1 | 11/2002 | Pallakoff | |
| 2004/0215647 A1 * | 10/2004 | Farn et al. | 707/101 |
| 2005/0091576 A1 * | 4/2005 | Relyea et al. | 715/502 |
| 2007/0074131 A1 * | 3/2007 | Assadollahi | 715/816 |
| 2007/0109266 A1 * | 5/2007 | Davis et al. | 345/163 |

OTHER PUBLICATIONS

TEGIC Communications, Inc., T9 Text Input, http://www.t9.com/, © 2006.

* cited by examiner

*Primary Examiner* — Jean B Jeanglaude
(74) *Attorney, Agent, or Firm* — Hoffman Warnick LLC; Douglas A. Lashmit (57) ABSTRACT

Method and apparatus for determining an alternative character string, in response to an invalid character string being received by a consumer application, wherein the invalid character string is derived from the selection of a series of keyboard keys in combination with a modifier key and wherein each key is associated with at least one glyph. An embodiment includes: a converter component for converting each glyph of the invalid character string into a first format; a converter component for parsing each of the converted first formats into a second format; an alternatives engine for determining from each of the second formats a third format which can be derived from a combination of a selection of the key and an alternative modifier key; and a converter component for converting each of the determined third formats into their associated glyphs for compiling into a list of alternative character strings.

12 Claims, 8 Drawing Sheets

DETERMINING AN ALTERNATIVE CHARACTER STRING

CROSS-REFERENCE TO RELATED APPLICATIONS

This application claims the benefit of co-pending European Patent Application No. EP07111433.4, filed 29 Jun. 2007, which is incorporated herein by reference.

FIELD OF THE INVENTION

The invention relates to the field of data input. In particular the invention relates to an improved method and apparatus for determining an alternative character string selection in response to an invalid character string being detected by a consumer application.

BACKGROUND OF THE INVENTION

A standard keyboard comprises many keys and each key is associated with a character of an alphabet, numbering system, punctuation mark, a currency symbol, and so on. The exact shape by which a character is represented is called a glyph. For example, a roman character 'A' and a roman italic character 'A' are two different types of glyphs representing the same character.

The number of glyphs that users need to use is increasing, for example, glyphs such as the Dollar, Euro or Yen currency symbols and special mathematical symbols, etc. However, even though the number of glyphs is increasing, the number of physical keys on a keyboard is decreasing because of a move to smaller devices with small keyboards. Consequently, it is normal for multiple glyphs to be obtained from the same physical key through the use of modifier keys.

A modifier key allows a user to access a particular glyph associated with a key by 'holding down' the modifier key in combination with the key. For example, the AltGr lock key or the shift key, etc. Some modifier keys toggle their state each time they are pressed, enabling their action to be 'latched'. Examples of this include the caps Lock key and the num Lock key. While the modifier key is latched into position, pressing other keys will often result in alternative glyphs being generated.

Consequently, a problem arises when a user forgets to unlatch a modifier key, after use and/or erroneous activation of the keys due to 'mis-keying' and thus continues to type characters strings that are not what was intended. Further these mistakes are frequently not easily corrected by normal techniques.

Consider the following text:
"Now is the time for all good men to do their duty"
When entered on, for example, an IBM laptop computer's keyboard with the num lock key engaged, the above sentence would read as follows:
"N6w 5s the t50e for a33 g66d 0en t6 d6 the5r d4ty"
A spell checker will be unable to correct this, though a good spell checker will find some words via statistical methods. For example, one well known word processing package will correct the above character stream to
"New 5s the t50e far a33g66d men t6 d6 their duty"
One partial solution to this problem is provided by spell checking applications which try and offer alternative text suggestions for an unrecognised character string based on various methods, including context. However, spell checking applications are unable to offer alternative character strings for the type described above.

Another partial solution to this problem is provided by a case-corrector application, which looks for inversion of expected case in a word at the start of a sentence. For example, oNCE, rather than Once, and flips the case of the words and turns off the caps lock modifier key.

Another partial solution is predictive text entry, such as systems that use dictionary methods to simplify text entry by using algorithms to predict the word that is being entered. However, this is cumbersome and impractical for general text entry, and is more suited to highly restricted keypads such as those found on devices like cellular telephones or PDAs.

Thus there is a need in the art to provide a solution to the above mentioned problems.

SUMMARY OF THE INVENTION

Viewed from a first aspect, the present invention provides an apparatus for determining an alternative character string, in response to an invalid character string being received by a consumer application, wherein the invalid character string is derived from a selection of a series of keyboard keys in combination with a modifier key and wherein each key is associated with at least one glyph, the apparatus comprising: a converter component for converting each glyph of the invalid character string into a first format; a converter component for parsing each of the converted first formats into a second format; an alternatives engine for determining from each of the second formats a third format which can be derived from a combination of the selection of the key and an alternative modifier key; and a converter component for converting each of the determined third formats into their associated glyphs for compiling into a list of alternative character strings.

The list of alternative character strings is communicated to a requesting consumer application for selecting one of the alternative character strings for replacing the detected invalid character string. The alternatives engine communicates an instruction to a keyboard controller to unlatch the modifier key in response to an alternative character string being selected by a consumer application. In an embodiment, the first format is a scan code and the second format is a key code.

The present invention further provides a keyboard for storing a list of mappings of scan codes to a key selection in combination with a modifier key for communicating to the apparatus as described above.

Viewed from another aspect, the present invention provides a method of determining an alternative character string, in response to an invalid character string being received by a consumer application, wherein the invalid character string is derived from the selection of a series of keyboard keys in combination with a modifier key and wherein each key is associated with at least one glyph; the method comprising converting each glyph of the invalid character string into a first format; parsing each of the converted first formats into a second format; determining from each of the second formats a third format which can be derived from a combination of a selection of the key and an alternative modifier key; and converting each of the determined third formats into their associated glyphs for compiling into a list of alternative character strings.

The list of alternative character strings is communicated to a requesting consumer application for selecting one of the alternative character strings for replacing with the detected invalid character string. The alternatives engine communicates an instruction to a keyboard controller to unlatch the modifier key in response to an alternative character string being selected by a consumer application. In an embodiment, the first format is a scan code and the second format is a key code.

Viewed from another aspect, the present invention provides a computer program product for determining an alternative character string, in response to an invalid character string being received by a consumer application, wherein the invalid character string is derived from the selection of a series of keyboard keys in combination with a modifier key and wherein each key is associated with at least one glyph, when executed on a computer, comprising software code portions for: converting each glyph of the invalid character string into a first format; parsing each of the converted first formats into a second format; determining from each of the second formats a third format which can be derived from a combination of a selection of the key and an alternative modifier key; and converting each of the determined third formats into their associated glyphs for compiling into a list of alternative character strings.

BRIEF DESCRIPTION OF THE DRAWINGS

Embodiments of the invention are described below in detail, by way of example only, with reference to the accompanying drawings.

DETAILED DESCRIPTION OF THE INVENTION

Figure 1:
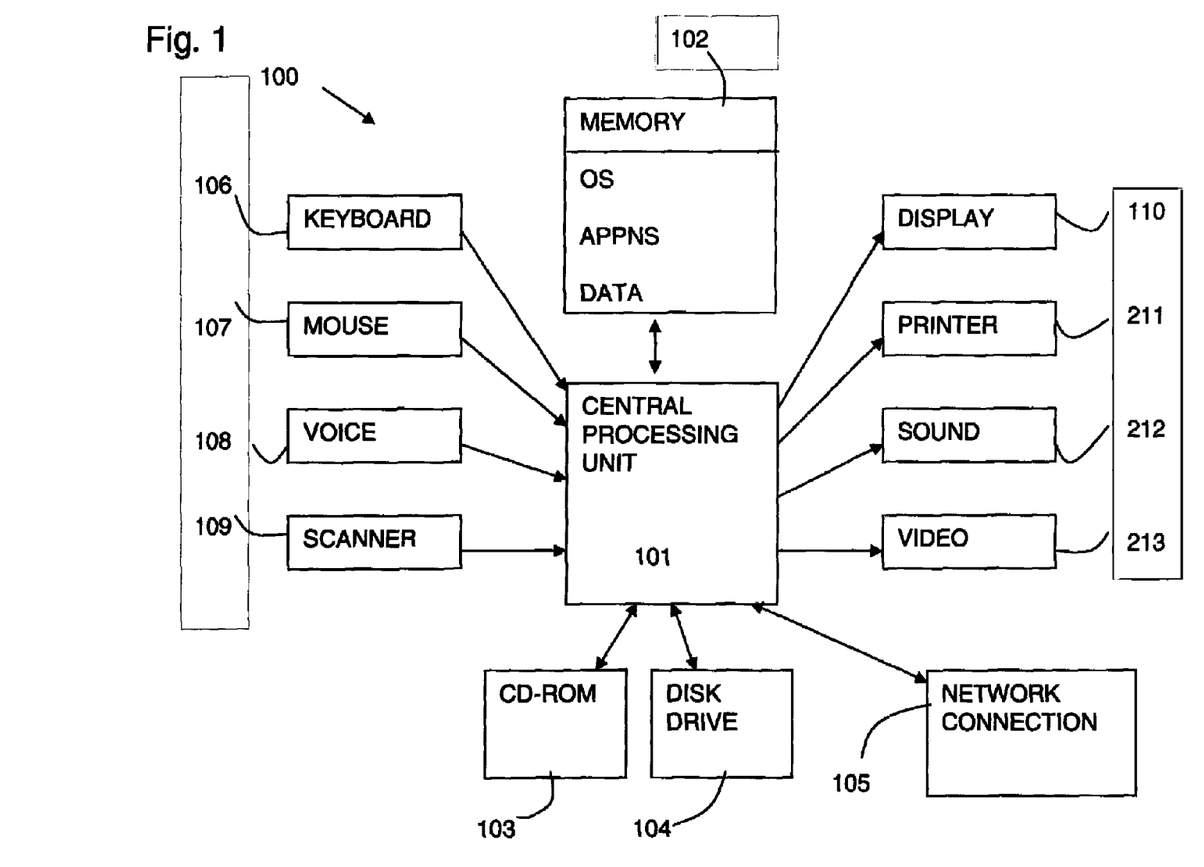
FIG. 1 is a block diagram of a data processing system in which the present invention may be embodied.

A computer system 100 is depicted in FIG. 1. The computer system 100 has a central processing unit 101 with primary storage in the form of memory 102 (RAM and ROM). The memory 102 stores program information and data acted on or created by application programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100, as shown in FIG. 1, may be connected via the network connection 105 to a server (not shown) on which applications may be run remotely from the central processing unit 101.

Applications may run on the computer system 100 from storage 103, 104 or via a network connection 105, which may include database applications etc. A user's computer system is not limited to any type of data processing system 100 or apparatus, and may be a conventional desktop or lap-top personal computer, a personal digital assistant or a mobile phone or any other specialized data processing device, which is capable of running a consumer application such as a text editor.

Figure 2:
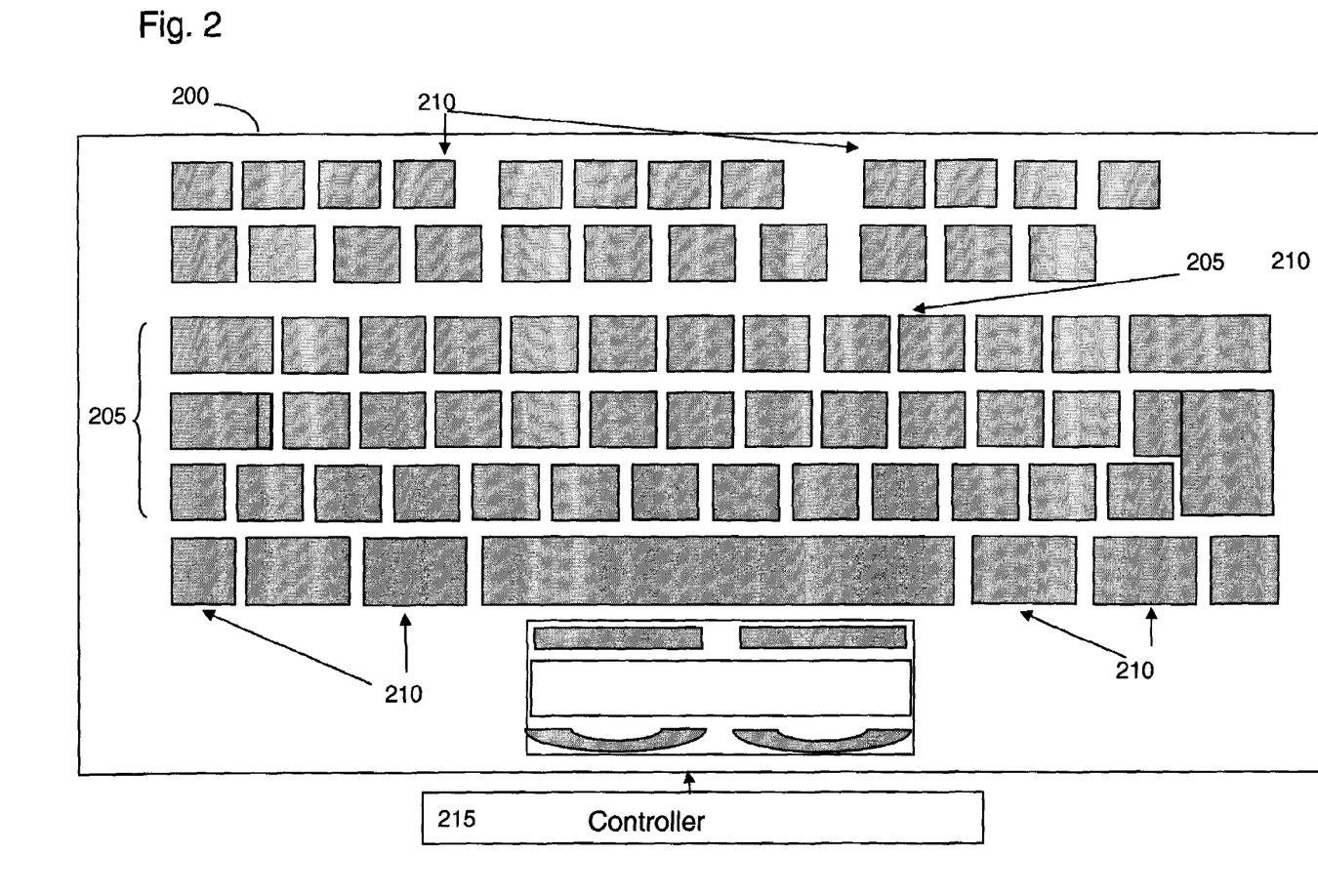
FIG. 2 is a block diagram of an example of an illustrative keyboard in which the present invention may be embodied.

FIG. 2 shows an example of a keyboard 200. The keyboard 200 interfaces with the computer system 100 via a standard hard wired keyboard connection or via a wireless connection. The keyboard 200 comprises a plurality of keys 205 and modifier keys 210. Each key 205 is associated with a glyph representing a character of the alphabet, a number associated with a numbering system, a punctuation symbol, a currency symbol or mathematical symbols, etc.

A glyph is accessed by pressing a key 205 associated with a glyph from the keyboard 200. A keyboard controller 215 detects that a key has been pressed and generates a scan code representing the key selection. When the key 205 is released the keyboard controller 215 detects that the key 205 has been de-selected and generates a further scan code representing the de-selection of the key 205.

When a modifier key 210 is pressed in combination with a key 205, then the keyboard controller 215 detects that the key 205 is pressed in combination with the modifier key 210 and produces a scan code representing this combination. Once the modifier key 210 and key combination 205 have been de-selected a further code is generated by the keyboard controller 215. For each scan code generated the keyboard controller 215 communicates each scan code to a keyboard driver (not shown) located on the computer system 100.

In order to provide the benefits of the present invention, the present invention provides a modified keyboard controller component operable on the keyboard 200 and an alternatives character string component for receiving scan codes from the keyboard driver (not shown) on the computer system 100. Each of these components will be explained in turn.

Figure 3:
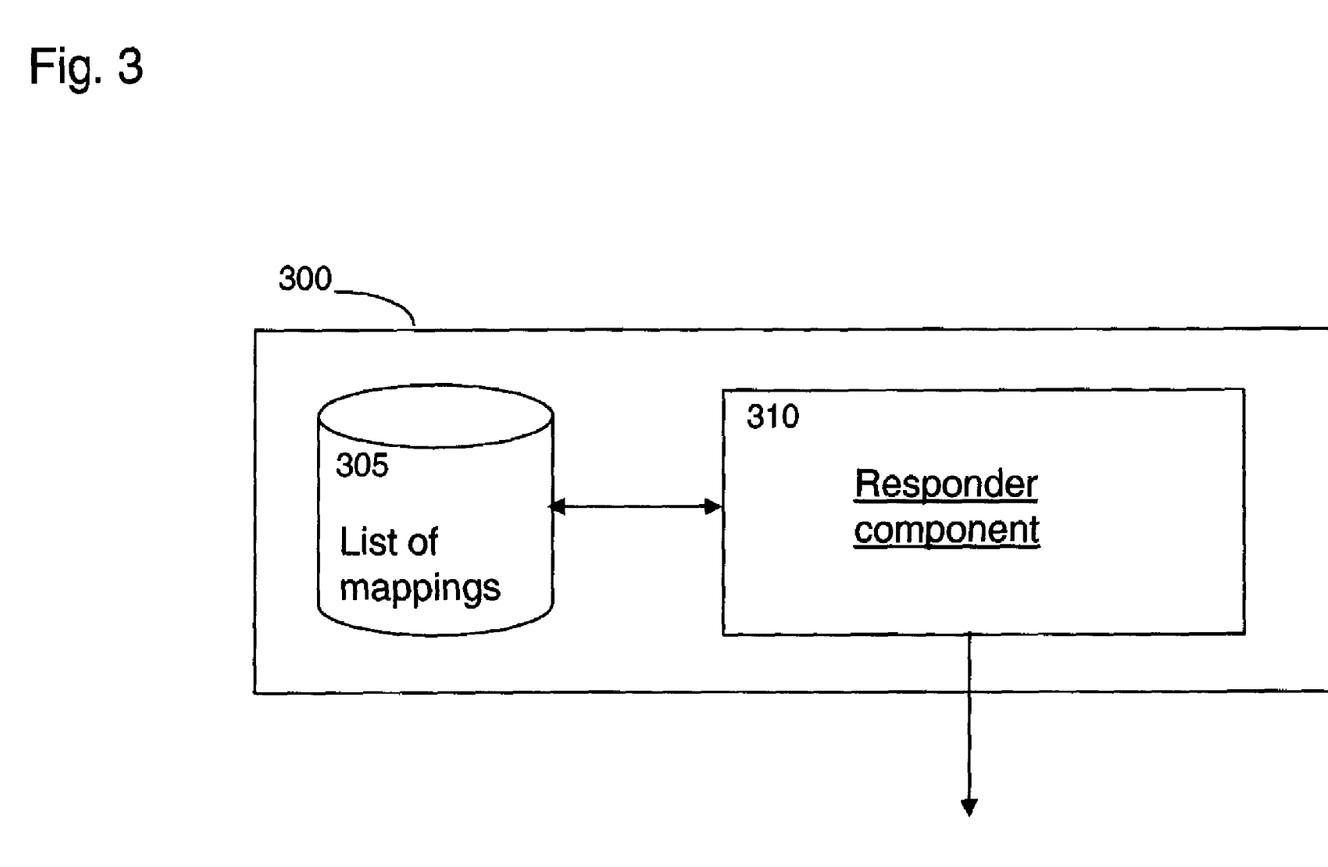
FIG. 3 is a block diagram detailing a modified keyboard controller in accordance with an embodiment of the present invention.

With reference to FIG. 3, the modified keyboard controller component 300 is installed in a keyboard 200. A modified keyboard controller component 300 extends the functionality of existing keyboard controllers 215 by providing a list of mappings of key selections, key de-selections, and modifier key combinations to scan codes. For example, pressing a key associated with the glyph 'a' in combination with a modifier key associated with the 'caps lock' key (in order to produce the glyph 'A'), the list of mappings will comprise a scan code representing the selection of the key associated with the glyph 'a' in combination with the latched 'caps lock' key.

The list of mappings provides a complete set of mappings for all combinations of key selections and key de-selection with all possible modifier keys.

In Table 1, below, a simplified example is shown of scan codes generated by certain combinations of key presses. Table 1 illustrates scan codes generated in order to display the character string 'hello'. For each character of the character string 'hello', and using an example of two modifier keys 210 latched into position, i.e., 'num lock' and 'caps lock', there are four possible scan codes which can be generated from the key codes generated by the key presses associated with each of the glyphs in the character string 'hello'.

For example, a scan code will be generated from the detection of the pressing of the key associated with the glyph 'h' without any modifier key, a scan code will be generated from the detection of the pressing of the key associated with the glyph 'h' with the 'num lock' modifier key latched into position, a scan code will be generated from the detection of the pressing of the key associated with the glyph 'h' with the 'caps lock' key latched into position, and a scan code will be generated from the detection of the pressing of the key associated with the glyph 'h' with the 'num lock' and 'caps lock' modifier key latched into position. Thus, for every key selected, a key code is produced which is then translated into a scan code.

Thus for the character string 'hello', and with reference to Table 1, a lookup in the table identifies that the scan codes for each of the key codes (1.2.3.3.4) produced when a user presses a key associated with each of the glyphs in the character string 'hello' are 10.20.30.30.40.

In reality there will also be scan codes generated each time a key is de-selected and the modifier key unlatched but in order to keep the following examples simple, only the use of scan codes for key selections will be discussed.

Now if the 'num lock' modifier key is latched into position and the character string 'hello' typed, the following character string would be generated 'h3II5'. Therefore, using the table below, the scan codes produced from the key presses associated with the character string 'h3115' would be 10.50.30.30.60.

TABLE 1 example scan code mappings for key codes to scan codes for the character string 'hello'

| Key codes | Modifier key | Scan code | Eventual resulting glyph |
|---|---|---|---|
| 1 (without modifier key) | — | 10 | h |
| 1 (with modifier key -num lock) | 1 | 10 | h |
| 1 (with modifier key - caps lock) | 2 | 70 | H |
| 1 (with modifier key - num lock + caps lock) | 3 | 70 | H |
| 2 (without modifier key) | — | 20 | e |
| 2 (with modifier key -num lock) | 1 | 50 | 3 |
| 2 (with modifier key - caps lock) | 2 | 90 | E |
| 2 (with modifier key - num lock + caps lock) | 3 | 50 | 3 |
| 3 (without modifier key) | — | 30 | l |
| 3 (with modifier key -num lock) | 1 | 30 | l |
| 3 (with modifier key - caps lock) | 2 | 80 | L |
| 3 (with modifier key - num lock + caps lock) | 3 | 80 | L |
| 4 (without modifier key) | — | 40 | o |
| 4 (with modifier key -num lock) | 1 | 60 | 5 |
| 4 (with modifier key - caps lock) | 2 | 100 | O |
| 4 (with modifier key - num lock + caps lock) | 3 | 60 | 5 |

The list of mappings 305 is stored by the keyboard controller component 215. There are often more than one set of keyboard mappings associated with a particular type of keyboard.

The modified keyboard controller 300 component also comprises a responder component 310 for listening and responding to requests from an alternative character string component installed in the computer system 100. These requests will typically comprise requesting a copy of the list of mappings 305 (as shown in the first three columns of Table 1) and transmitting the copy to the alternative character string component. Typically, this request will occur, for example, when the keyboard driver installed on the computer system 100 detects that a new keyboard 200 has been attached to the computer system 100.

Figure 4:
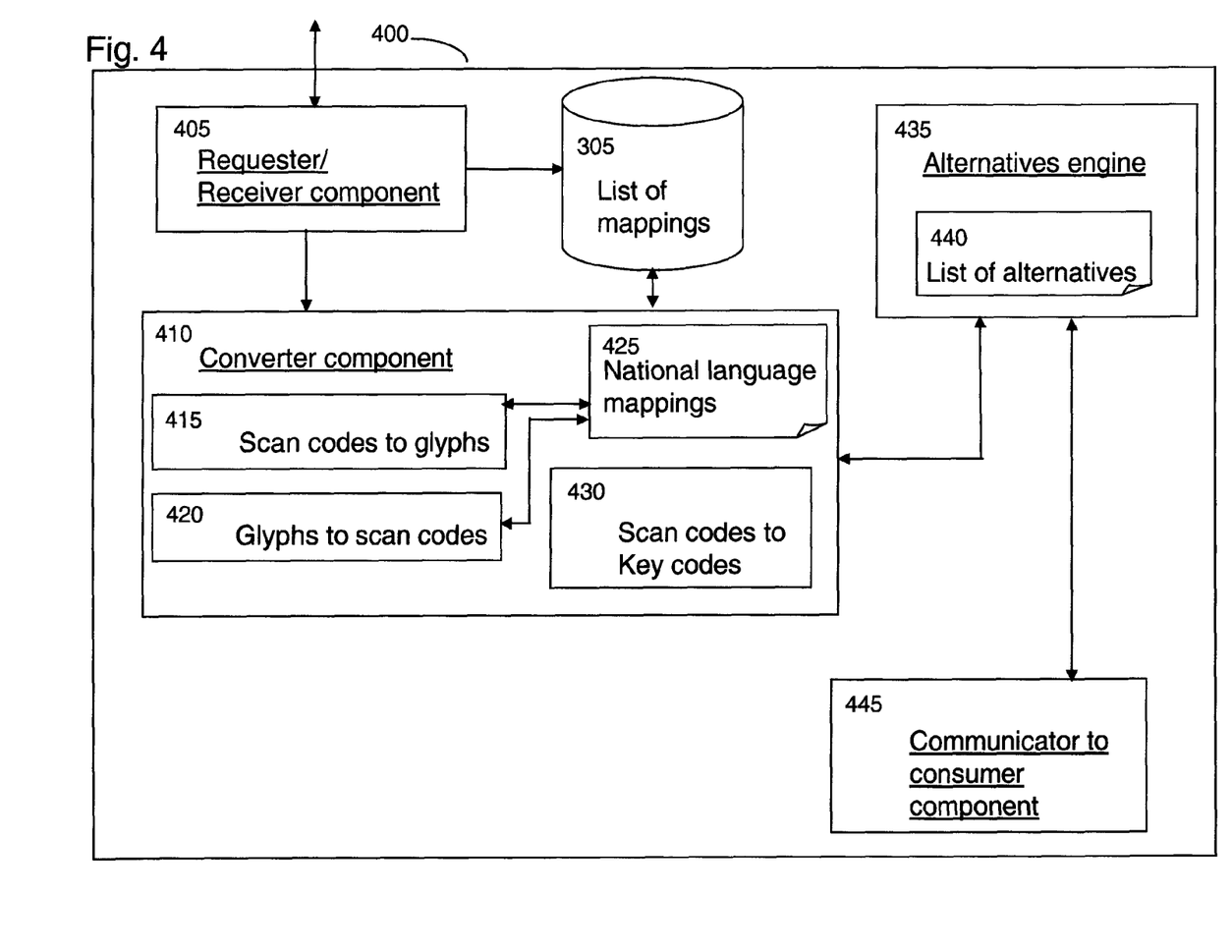
FIG. 4 is a block diagram detailing the alternative character string component in accordance with an embodiment of the present invention.

In an embodiment of the present invention and with reference to FIG. 4, the modified keyboard controller component 300 interfaces with an alternative character string component 400 located on the computer system 100. The alternative character string component 400 extends the functionality of existing keyboard drivers by (a) handling scan codes received from the modified keyboard driver component 300, via the keyboard driver, and (b) for interfacing with a consumer application, such as, a spell checking application in order to suggest an alternative character string in response to a consumer application not being able to offer a suitable alternative character string. The components of the alternative character string component 400 are explained below.

A requester/receiver component 405 requests and receives the list of mappings 305 (e.g., columns 1 to 3 of Table 1) from the modified keyboard controller 300 component. Once received, the requestor/receiver component 405 stores the list of mappings 305 in the data store.

A converter component 410 comprises a number of sub components for performing conversion operations on scan codes, glyphs and/or key codes at particular phases of the process. Illustrative conversion operations are as follows:
a) Converting scan codes received from the modified keyboard controller 300 to glyphs for passing onto a consumer application by the scan code to glyphs converter component 415;
b) Converting glyphs to scan codes when an alternative character string is required by a consumer application, by the glyphs to scan codes converter component 420; and
c) Converting scan codes to key codes when an alternative character string is required by a consumer application by the scan codes to key codes converter component 430.

In a first instance, keys selections are made via a keyboard 200 and the modified keyboard controller 300 communicates the generated scan codes to the alternative character string component 400 for processing.

The modified keyboard component 300 processes the incoming scan codes in the same way that a traditional keyboard driver does. As each scan code is received, the scan code to glyph converter component 415 interfaces with a national language mappings component 425 in order to perform a lookup in the table (see table 2 for example) to convert each of the received scan codes into its corresponding glyph. Obviously, there are different national language mappings for different national languages and for different types of keyboards, for example, Dvorak etc.

An example of this is shown in Table 2 below. This information is also shown in the fourth column of Table 1.

TABLE 2

National language mappings of scan codes to glyphs (English language)

| Scan codes | Glyphs |
|---|---|
| 10 | h |
| 20 | e |
| 30 | l |
| 40 | o |

TABLE 2-continued

National language mappings of scan
codes to glyphs (English language)

| Scan codes | Glyphs |
|---|---|
| 50 | 3 |
| 60 | 5 |
| 70 | H |
| 80 | L |
| 90 | E |
| 100 | O |

Once each scan code is converted, the scan code to glyph converter component 415 communicates the resulting character string to the consuming application. For example, if the scan codes received are 10.20.30.30.40, then this is converted into the character string 'hello'. The character string 'hello' is then communicated to the consumer application in the normal manner.

In another instance, the alternative character string component 400 also comprises an alternatives engine 435 for receiving a request for an alternative character string from a consumer application. For example, instead of the character string 'hello' being entered into the computer system 100, the character string 'h3Il5' was entered instead because a modifier key was left in the latched position. At this point the consumer application detects that 'h3Il5' is an invalid character string using existing methods such as spellcheckers, and requests a list of alternative character strings.

The received request comprises a copy of the invalid character string, i.e. 'h3Il5', which the consumer application is unable to process. The alternatives engine 435 passes the received character string to the glyph to scan code converter component 420 for processing.

The glyph to scan code converter component 420 converts each glyph within the character string into its corresponding scan code. This is carried out by performing a lookup in a list of mappings (see Table 2 for an example). For example, if the received character string is 'h3Il5' then the glyph to scan code converter component 420 will perform a lookup in the mappings table (see Table 2 for an example) and convert the glyph 'h' to its associated scan code of 10, the glyph '3' to its associated scan code of 50, the glyph 'I' to its scan code of 30 and the glyph '5' to its scan code of 60. Once this step is completed, the alternatives engine 435 instructs the scan code to key code converter component 430 to convert the converted scan code string into its corresponding key code. This is achieved by performing a lookup in the list of mappings 305 (see Table 1 for an example), such that the above scan code of 10.50.30.30.60 is converted to 1.2.3.3.4.

The alternatives engine takes this generated key code string and for each of the key codes in the string determines a list of possible scan codes indexed by possible modifier keys. For example, taking the string of key codes 1.2.3.3.4 and using Table 1 (for example), the alternatives engine 435 generates the following table

TABLE 3

Example of scan codes indexed by modifier

| Modifier | | | | | |
|---|---|---|---|---|---|
| — | 10 | 20 | 30 | 30 | 40 |
| 1 | 10 | 50 | 30 | 30 | 60 |
| 2 | 70 | 90 | 80 | 80 | 100 |
| 3 | 70 | 50 | 80 | 80 | 60 |

The alternatives engine 435 then proceeds to perform a final lookup in the mappings of scan code to glyphs (see Table 2 for an example) to convert the converted scan codes into glyphs.

Thus using the data from the scan codes, indexed by modifier, (see Table 3 for an example) and the scan codes to glyph table (see Table 2 for an example), the following list of alternatives can be generated for transmitting to the requesting consumer application.

List of Alternatives
Please select from the list
hello
h3Il5
HELLO
H3LL5

Upon receipt of the list of alternatives by the consumer application, an alternative can be selected. This may be performed either manually by a user, or by selecting the best alternative using some automated system. For example, this could be based on the results of spell checking each of the alternatives and the selecting the best option.

In another embodiment, the alternatives engine 435 may instruct the consumer application to turn off a particular modifier key 205 in order to prevent any further typing with the modifier key latched into position. In another embodiment, the consumer application may indicate to the alternatives engine 435 which alternative it selected as correct and instruct the alternatives engine to enable that modifier state for further typing.

FIG. 5 to 8 detail illustrative process steps of the present invention and will now be explained with an example.

Figure 5:
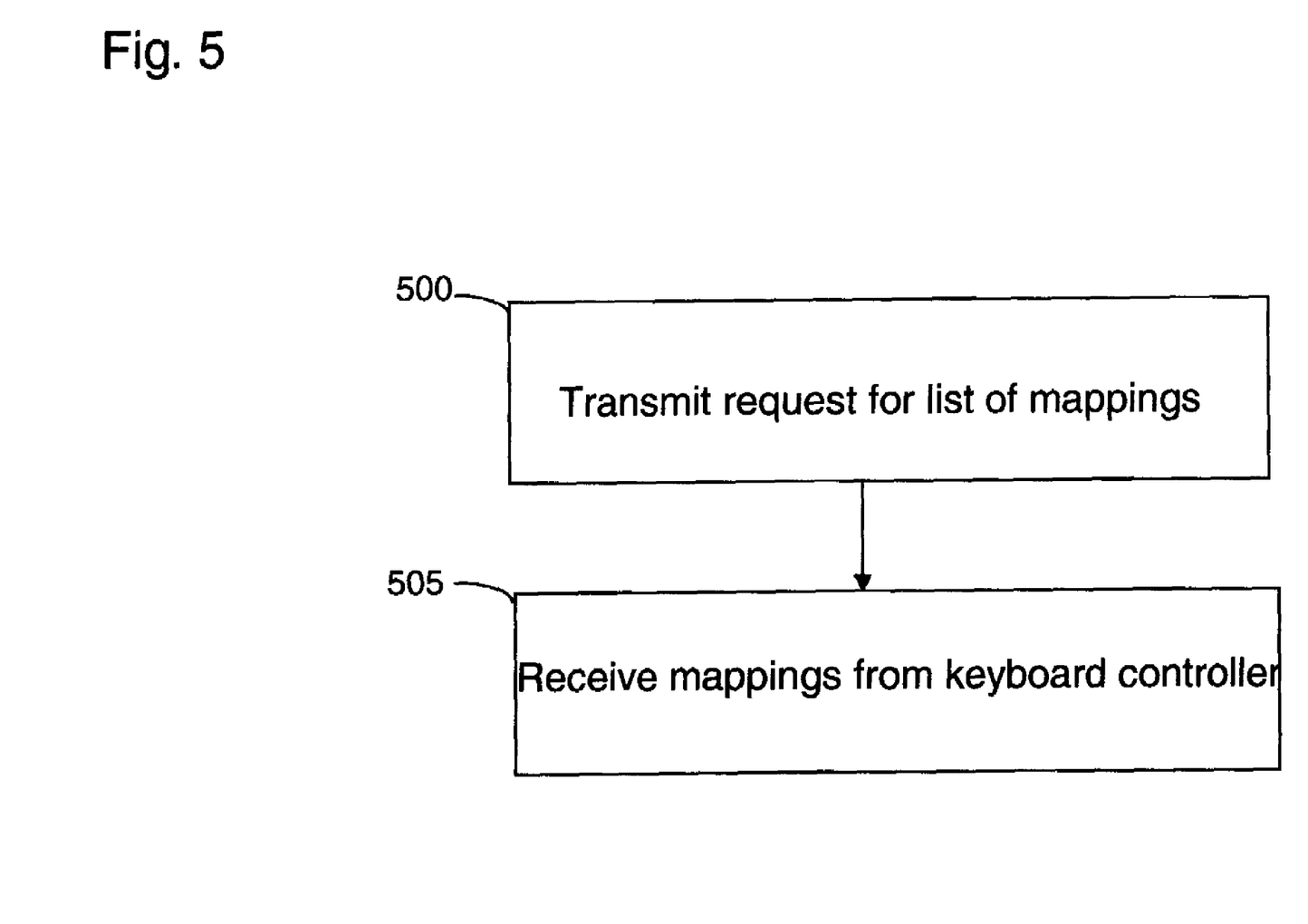
FIG. 5 is a flow chart showing the process steps of requesting a mapping list from the modified keyboard controller component, in accordance with an embodiment of the present invention.

On detection of a new keyboard 200 being attached to the computer system 100, the receiving component 405 transmits (step 500) a request to the responder component 310 to transmit a copy of the keyboard's mapping list 305. On receipt (step 505) of the mapping list 305, the receiving component 405 stores the list 305 in a data store for further processing.

Figure 6:
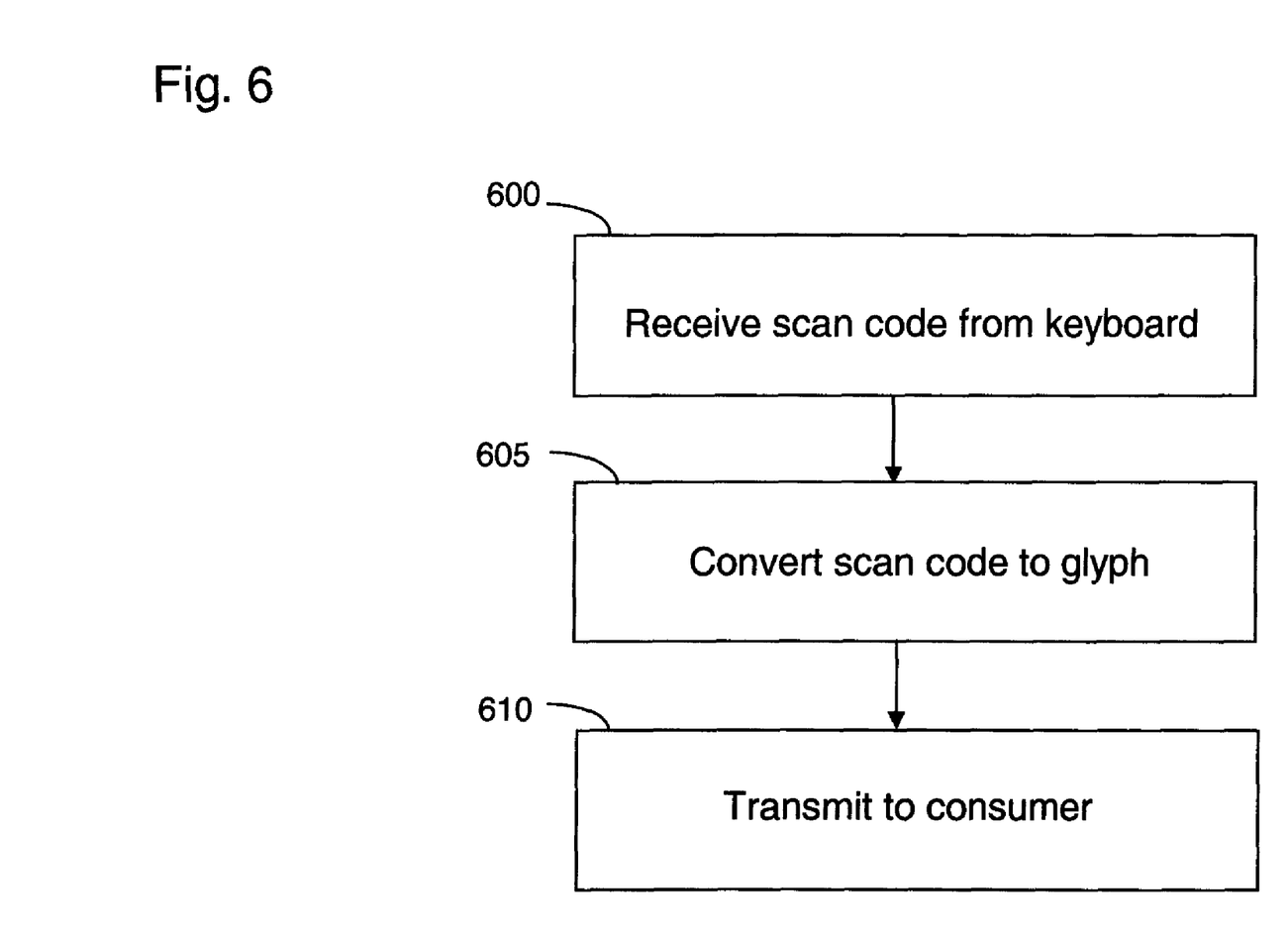
FIG. 6 is a flow chart showing illustrative process steps of the alternative character string component receiving scan codes from the keyboard controller.

As keys are selected and deselected from the keyboard 200 the receiving component 405 receives (step 600) the scan codes that are associated with the selected and de-selected keys. The receiving component 405 communicates the received scan codes to the scan code to glyph converter component 415 for converting into glyphs (step 605). The converted glyphs are then communicated to the consumer application for processing in the usual manner (step 610).

Figure 7:
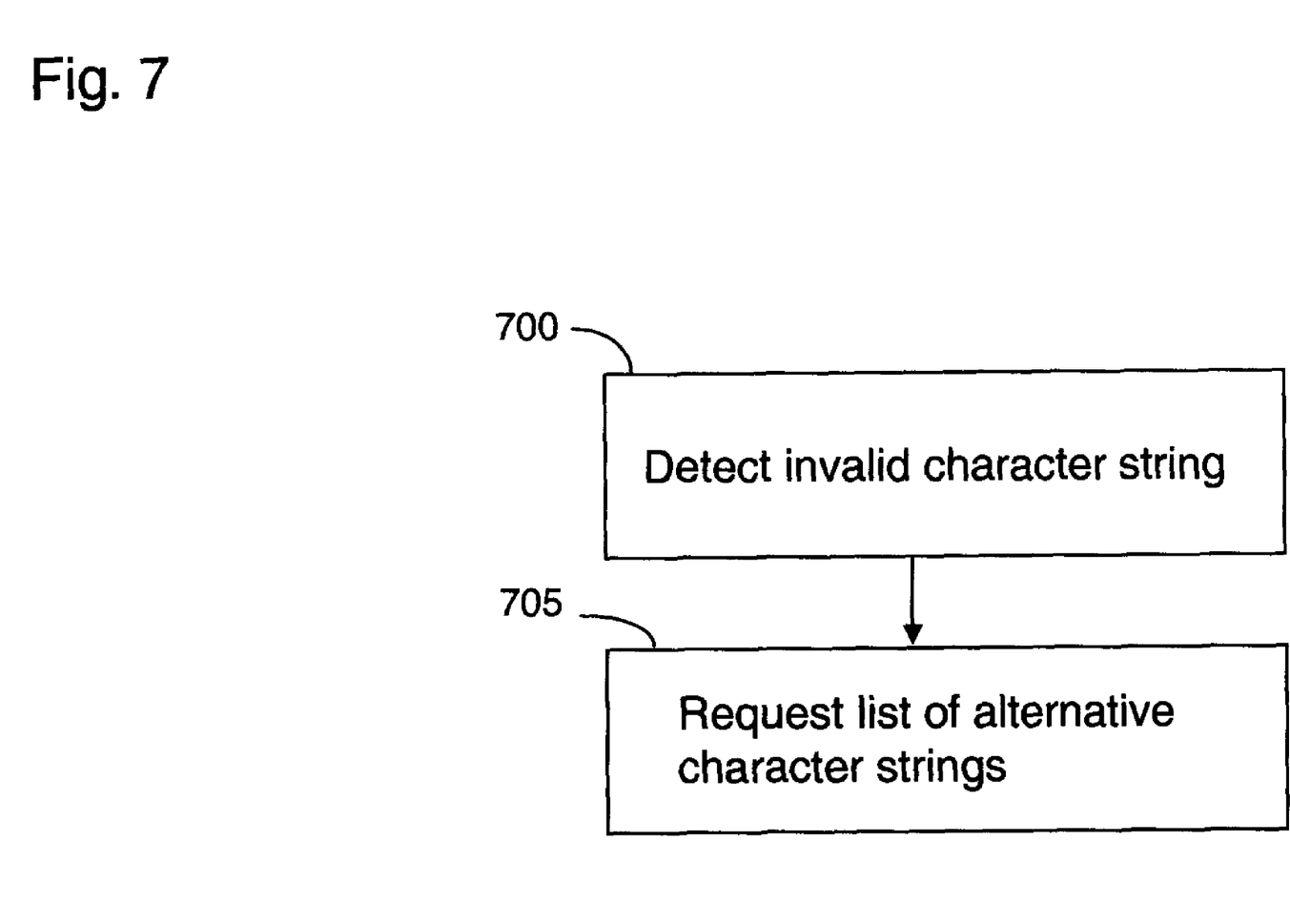
FIG. 7 is a flow chart showing illustrative process steps of a consumer application detecting an invalid character string.

On detection of an invalid character string (step 700), by the consumer application, the consumer application requests (step 705) from the alternative character string component 400 a list of alternative character strings for selection by the consumer application.

The alternatives character string component 400 receives the invalid character string from the consumer application, for example, the character string 'h3Il5' and proceeds to determine a number of other character strings that could be derived by pressing the same keys that produced the character string, and using all the combinations of modifier keys available on that keyboard.

Figure 8:
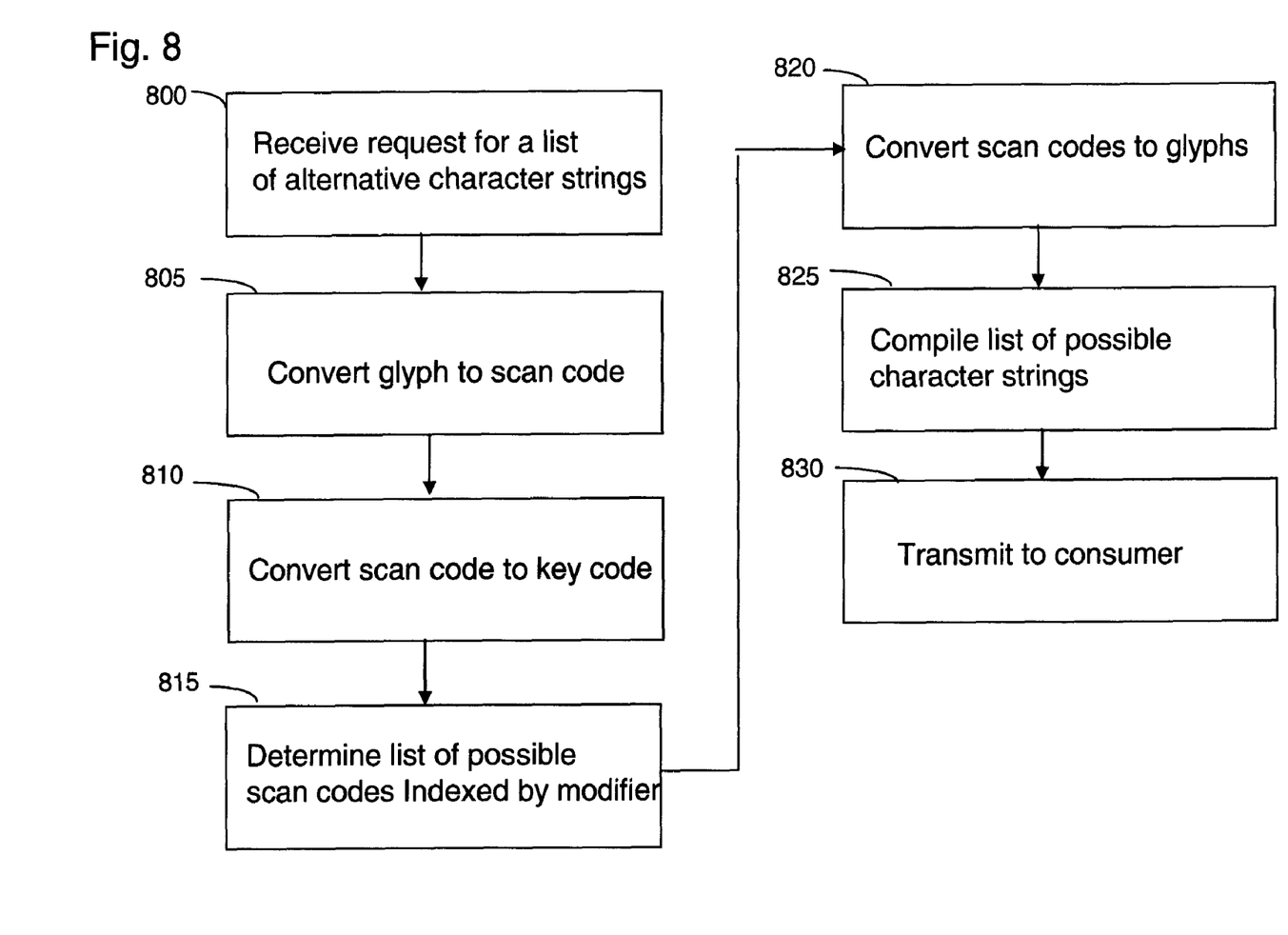
FIG. 8 is a flow chart showing illustrative process steps of the alternative character string component processing an invalid character string in order to derive a list of alternative character strings.

Firstly (step 800), the alternatives character string component 400 receives the request and requests that the glyph to scan code converter component 420 converts (step 805) each of the glyphs into their corresponding scan codes by performing a lookup in the scan code to glyphs mapping table (see Table 2 for an example). Thus using this table the corresponding scan codes for 'h3Il5' can be derived as 70.50.80.80.60.

Next, (step 810), the scan code to key code converter component 430 converts each of the scan codes into their corresponding key codes by performing a lookup in Table 1. Thus, the scan code string 70.50.80.80.60 can be derived as 1.2.3.3.4.

Next (step 815), the alternatives engine 435 determines a list of alternative character strings which can be derived from the invalid character string by determining which other glyph combinations can be derived from the key selections, in combination with all the combination of modifier keys, used to type the invalid character string.

The alternatives engine 435 performs a lookup in Table 1 and begins by locating each of the key codes from the generated key code string i.e. 1.2.3.3.4. Then for each key code, the alternatives engine 435 determines the scan code that is produced by selecting the key code in combination with one or modifier keys.

Thus with reference to Table 1, for key code 1, the following scan codes can be derived:

| Key code | Modifier key | Scan code |
| --- | --- | --- |
| 1 (without modifier key) | — | 10 |
| 1 (with num lock key) | 1 | 10 |
| 1 (with caps lock key) | 2 | 70 |
| 1 (with num lock and caps lock key) | 3 | 70 |

This process step is performed for each key code in the key code string, until such a time as no other combinations can be derived.

Then, the alternatives engine 435, sends a list of generated scan codes to the convert scan codes to glyphs component 430 for converting from scan code to glyphs (by using Table 2) (step 820).

For example, using the invalid character string 'h3II5', the following alternative scan codes can be derived.
10.20.30.30.40
10.50.30.30.60
70.90.80.80.100
70.50.80.80.60

Next, at step 825, the alternatives engine 435, using the, the list of alternative scan codes, requests the scan code to glyph converter component 415 to translate the scan codes into glyphs thus deriving the following alternative character strings:
List of Alternatives
hello
h3II5
HELLO
H3LL5

This list is then transmitted to the consumer application for processing. Once the consumer application selects the appropriate character string, a signal can also be sent back to the alternatives engine informing the alternatives engine 435 of the selection. Therefore, because the alternative engine 435 has knowledge of which keys were selected in order to arrive the invalid character string, the alternatives engine 435 can transmit a signal to the keyboard driver asking the keyboard driver to interface with the keyboard controller 215 in order to 'latch' or unlatched one or more modifier key which caused the invalid character string.

It will be clear to one of ordinary skill in the art that all or part of the method of the embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, embodiment(s) of the present invention may be realized in the form of a computer implemented method of deploying a service comprising steps of deploying computer program code operable to, when deployed into a computer infrastructure and executed thereon, cause said computer system to perform all the steps of the method.

In a further alternative, embodiment(s) of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. An apparatus for determining an alternative character string, in response to an invalid character string being received by a consumer application, wherein the invalid character string is derived from the selection of a series of keyboard keys in combination with a modifier key and wherein each key is associated with at least one glyph; the apparatus comprising:
 a converter component for converting each glyph of the invalid character string into a first format;
 a converter component for parsing each of the converted first formats into a second format;
 an alternatives engine for determining from each of the second formats a third format which can be derived from a combination of a selection of the key and an alternative modifier key; and
 a converter component for converting each of the determined third formats into their associated glyphs for compiling into a list of alternative character strings.

2. The apparatus of claim 1, wherein the list of alternative character strings is communicated to a requesting consumer application for selecting one of the alternative character strings for replacing the detected invalid character string.

3. The apparatus of claim 1, wherein the alternatives engine communicates an instruction to a keyboard controller to unlatch the modifier key in response to an alternative character string being selected by a consumer application.

4. The apparatus of claim 1, wherein the first format is a scan code.

5. The apparatus of claim 1, wherein the second format is a key code.

6. The apparatus of claim 1, further comprising a keyboard for storing a list of mappings of scan codes to a key selection in combination with a modifier key.

7. A method of determining an alternative character string, in response to an invalid character string being received by a consumer application, wherein the invalid character string is derived from the selection of a series of keyboard keys in combination with a modifier key and wherein each key is associated with at least one glyph; the method comprising:
 converting each glyph of the invalid character string into a first format;
 parsing each of the converted first formats into a second format;
 determining from each of the second formats a third format which can be derived from a combination of a selection of the key and an alternative modifier key; and
 converting each of the determined third formats into their associated glyphs for compiling into a list of alternative character strings.

8. The method of claim 7, wherein the list of alternative character strings is communicated to a requesting consumer application for selecting one of the alternative character strings for replacing with the detected invalid character string.

9. The method of claim 7, wherein an instruction is communicated to a keyboard controller to unlatch the modifier key in response to an alternative character string being selected by a consumer application.

10. The method of claim 7, wherein the first format is scan code.

11. The method of claim 7, wherein the second format is a key code.

12. A computer program product stored on a non-transitory computer readable medium for determining an alternative character string, in response to an invalid character string being received by a consumer application, wherein the invalid character string is derived from the selection of a series of keyboard keys in combination with a modifier key and wherein each key is associated with at least one glyph, when executed on a computer, comprising software code portions for:
 converting each glyph of the invalid character string into a first format;
 parsing each of the converted first formats into a second format;
 determining from each of the second formats a third format which can be derived from a combination of a selection of the key and an alternative modifier key; and
 converting each of the determined third formats into their associated glyphs for compiling into a list of alternative character strings.

* * * * *